(12) United States Patent
Morimura

(10) Patent No.: US 8,978,504 B2
(45) Date of Patent: Mar. 17, 2015

(54) SHIFT DEVICE

(71) Applicant: Kabushiki Kaisha Tokai-Rika-Denki-Seisakusho, Aichi-ken (JP)

(72) Inventor: Kunihiro Morimura, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 253 days.

(21) Appl. No.: 13/648,420

(22) Filed: Oct. 10, 2012

(65) Prior Publication Data

US 2013/0091972 A1    Apr. 18, 2013

(30) Foreign Application Priority Data

Oct. 13, 2011 (JP) ................. 2011-226049

(51) Int. Cl.
*B60K 20/00*   (2006.01)
*G05G 5/00*   (2006.01)
*F16H 61/22*   (2006.01)

(52) U.S. Cl.
CPC .......... *F16H 61/22* (2013.01); *F16H 2061/223* (2013.01)
USPC .................... 74/473.23; 74/473.21

(58) Field of Classification Search
CPC . F16H 59/10; F16H 61/22; F16H 2059/0282; F16H 63/36; F16H 59/02
USPC ................ 74/473.21, 473.23, 473.24, 473.25
See application file for complete search history.

(56) References Cited

U.S. PATENT DOCUMENTS

| 6,827,195 B2 * | 12/2004 | Kliemannel ............... 192/220.4 |
| 2003/0079561 A1 * | 5/2003 | Schmidt et al. ............ 74/473.23 |
| 2004/0237694 A1 * | 12/2004 | Lindenschmidt et al. . 74/473.21 |
| 2004/0244524 A1 * | 12/2004 | Russell ...................... 74/473.23 |

FOREIGN PATENT DOCUMENTS

| JP | 6-4458 | 1/1994 |
| WO | 2005/025916 A1 | 3/2005 |

* cited by examiner

*Primary Examiner* — Justin Krause
(74) *Attorney, Agent, or Firm* — Roberts Mlotkowski Safran & Cole P.C.

(57) ABSTRACT

In a shift lever device, operation of a shift lever to a "P" shift position is allowed when electric-power is not supplied to a solenoid in a state where the shift lever has been operated to a shift position other than the "P" shift position. Moreover, operation of the shift lever from the "P" shift position is regulated when electric-power is not supplied to a lock solenoid in a state where the shift lever has been operated to the "P" shift position. Therefore, in a case where the shift position of the shift lever is other than the "P" shift position when electric-power is not supplied to the solenoid and the lock solenoid, operation of the shift lever from the "P" shift position can be regulated by operating the shift lever to the "P" shift position, and the shift lever can be placed in the "P" shift position.

6 Claims, 9 Drawing Sheets

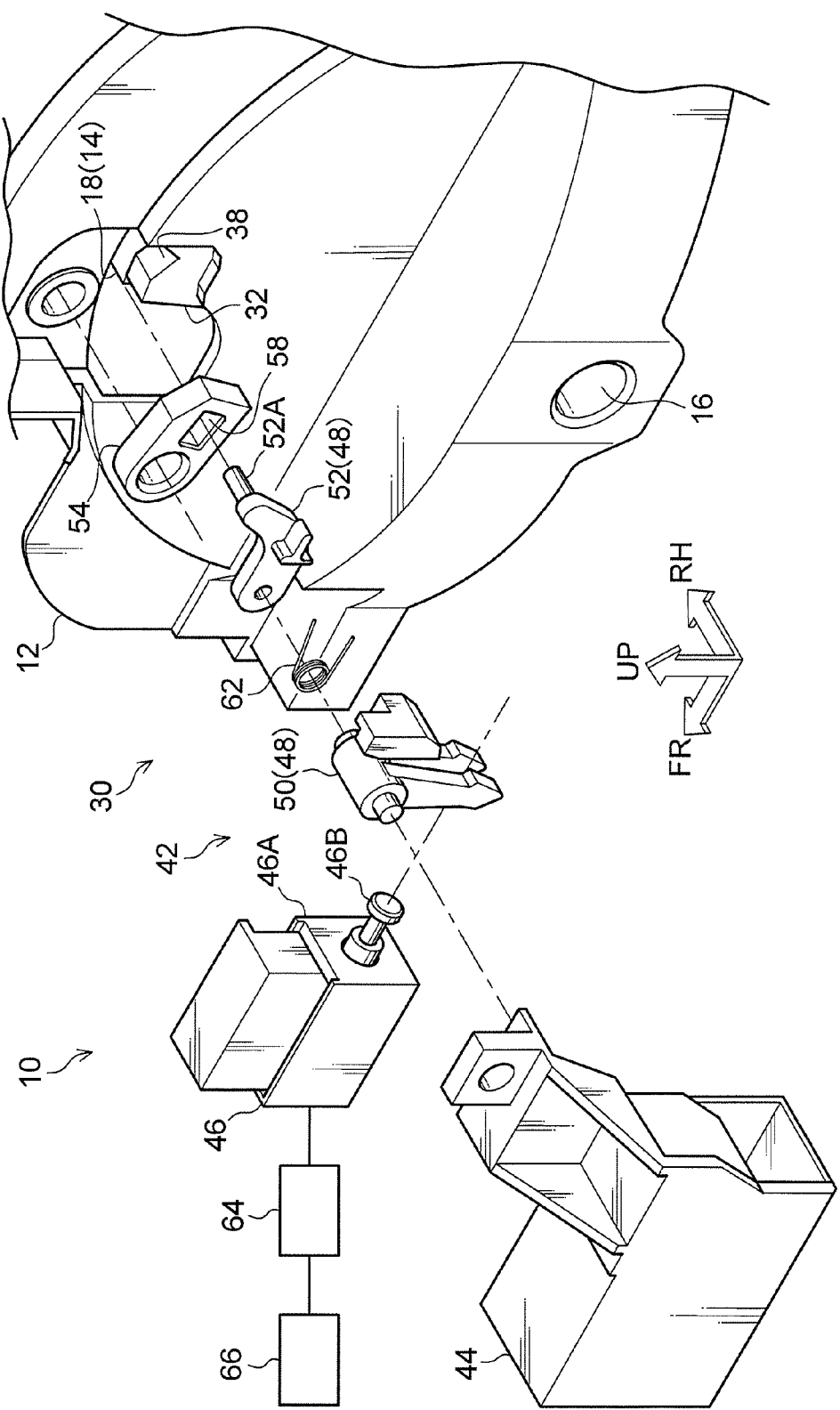

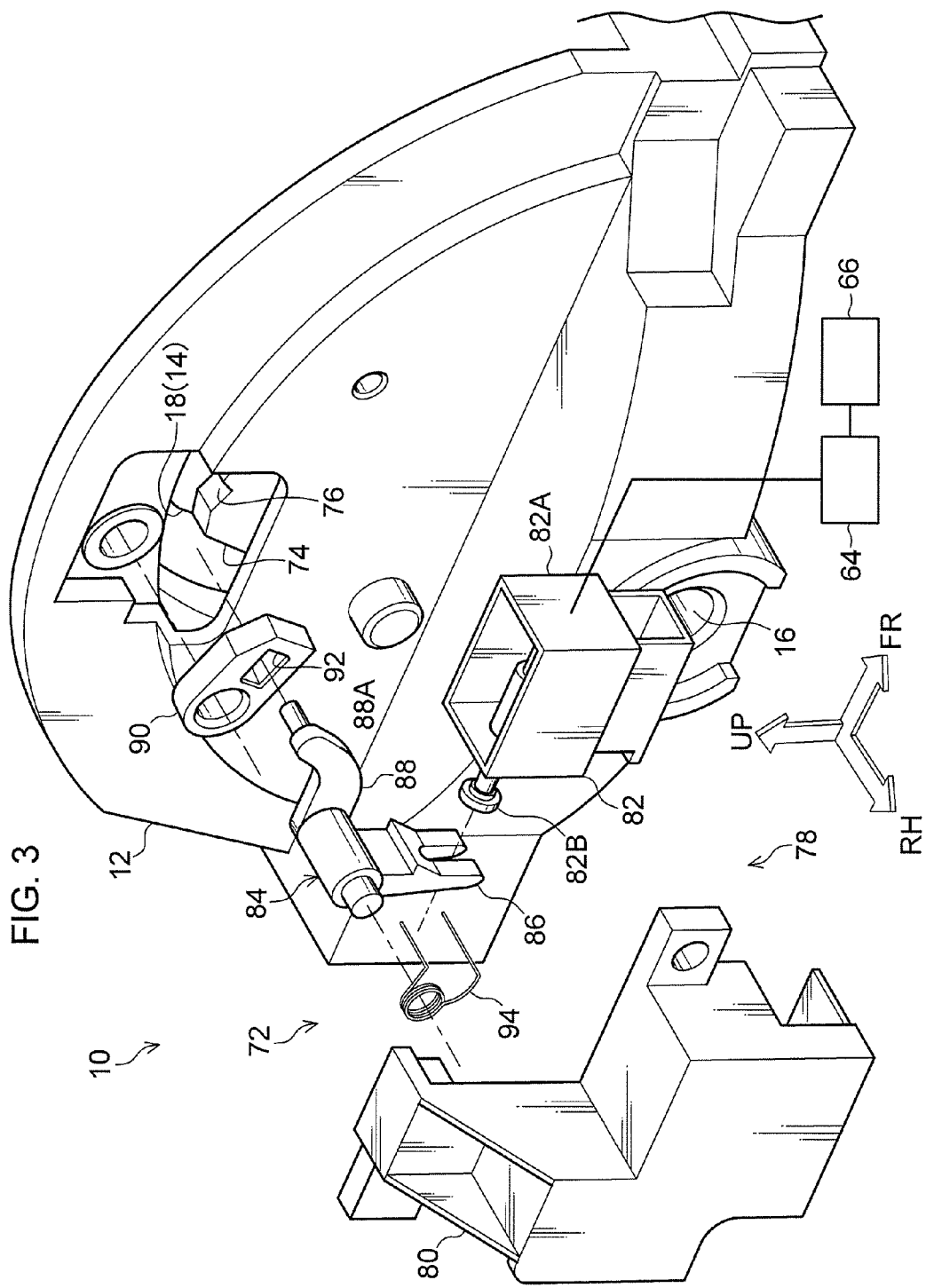

SHIFT DEVICE

CROSS-REFERENCE TO RELATED APPLICATION

This application claims priority under 35 USC 119 from Japanese Patent Application No. 2011-226049 filed Oct. 13, 2011, the disclosure of which is incorporated by reference herein.

BACKGROUND OF THE INVENTION

1. Field of the Invention

The present invention relates to a shift device whose shift position is changed by a shift member being operated.

2. Related Art

In a conventional shift lever device, operation of the shift lever is regulated as a result of a pin of a solenoid being engaged with a recessed groove in a detent plate. Moreover, when a shift lock button on the shift lever has been operated or the brake pedal has been stepped on, the pin becomes disengaged from the recessed groove and operation of the shift lever is allowed.

However, in this shift lever device, in all the shift positions of the shift lever when electric power is not supplied to the solenoid, operation of the shift lever is either always regulated or always allowed.

Here, when electric power is not supplied to the solenoid, there a case where it is preferred that the shift lever be able to be placed in a predetermined shift position (e.g., the Park position).

SUMMARY OF THE INVENTION

In consideration of the above circumstances, the present invention is to obtain a shift device in which a shift member can be placed in a predetermined shift position when electric power is not supplied to a regulation mechanism.

A shift device pertaining to a first aspect of the invention includes: a shift member whose shift position is configured to be changed by the shift member being operated; and a regulation mechanism, by which operation of the shift member toward a predetermined shift position is regulated and operation of the shift member from the predetermined shift position is allowed by electric power being supplied to the regulation mechanism, and by which operation of the shift member toward the predetermined shift position is allowed and operation of the shift member from the predetermined shift position is regulated by electric power not being supplied to the regulation mechanism.

A shift device pertaining to a second aspect of the invention is the shift device pertaining to the first aspect further includes an operation portion by which electric power is supplied to the regulation mechanism and operation of the shift member toward the predetermined shift position is regulated by the operation portion not being operated, and by which electric power is not supplied to the regulation mechanism and operation of the shift member toward the predetermined shift position is allowed by the operation portion being operated.

It is possible in the second aspect that in a state in which the shift member is at a position other than the predetermined shift position, electric power is supplied to the regulation mechanism and operation of the shift member toward the predetermined shift position is regulated by the operation portion not being operated, and electric power is not supplied to the regulation mechanism and operation of the shift member toward the predetermined shift position is allowed by the operation portion being operated.

It is possible in the second aspect that the regulation mechanism includes an engagement mechanism, and by electric power not being supplied to the engagement mechanism by the operation portion being operated, engagement by the engagement mechanism between a body at which the shift member is rotatably supported and the shift member is released.

A shift device pertaining to a third aspect of the invention is the shift device pertaining to the second aspect, wherein electric power is not supplied to the regulation mechanism and operation of the shift member from the predetermined shift position is regulated by the operation portion not being operated, and electric power is supplied to the regulation mechanism and operation of the shift member from the predetermined shift position is allowed by the operation portion being operated.

It is possible in the third aspect that in a state in which the shift member is at the predetermined shift position, electric power is not supplied to the regulation mechanism and operation of the shift member from the predetermined shift position is regulated by the operation portion not being operated, and electric power is supplied to the regulation mechanism and operation of the shift member from the predetermined shift position is allowed by the operation portion being operated.

It is possible in the third aspect that the regulation mechanism includes a lock mechanism, and by electric power being supplied to the lock mechanism by the operation portion being operated, engagement by the lock mechanism between a body at which the shift member is rotatably supported and the shift member is released.

A shift device pertaining to a fourth aspect of the invention is the shift device pertaining to the second aspect or the third aspect, wherein the operation portion is disposed on the shift member.

In the shift device pertaining to the first aspect, the shift position is changed as a result of the shift member being operated. Moreover, operation of the shift member to the predetermined shift position is regulated and operation of the shift member from the predetermined shift position is allowed as a result of electric power being supplied to the regulation mechanism.

Here, operation of the shift member to the predetermined shift position is allowed and operation of the shift member from the predetermined shift position is regulated as a result of electric power not being supplied to the regulation mechanism.

For this reason, in a case where the shift position of the shift member is other than the predetermined shift position when electric power is not supplied to the regulation mechanism, operation of the shift member from the predetermined shift position is regulated by operating the shift member to the predetermined shift position. Moreover, in a case where the shift position of the shift member is the predetermined shift position when electric power is not supplied to the regulation mechanism, operation of the shift member from the predetermined shift position is regulated.

Due to this, the shift member can be placed in the predetermined shift position when electric power is not supplied to the regulation mechanism.

In the shift device pertaining to the second aspect, electric power is supplied to the regulation mechanism and operation of the shift member toward the predetermined shift position is regulated by the operation portion not being operated, electric power is not supplied to the regulation mechanism and operation of the shift member toward the predetermined shift position is allowed by the operation portion being operated.

For this reason, operation of the shift member to the predetermined shift position can be switched from regulated to allowed by operating the operation portion.

In the shift device pertaining to the third aspect, electric power is not supplied to the regulation mechanism and operation of the shift member from the predetermined shift position is regulated by the operation portion not being operated, and electric power is supplied to the regulation mechanism and operation of the shift member from the predetermined shift position is allowed by the operation portion being operated.

For this reason, operation of the shift member from the predetermined shift position can be switched from regulated to allowed by operating the operation portion.

In the shift device pertaining to the fourth aspect, the operation portion is disposed on the shift member. For this reason, the operation portion can be easily operated.

BRIEF DESCRIPTION OF THE DRAWINGS

An embodiment of the invention will be described in detail with reference to the following figures, wherein:

FIG. 2 is an exploded perspective view showing an engagement mechanism of the shift lever device pertaining to the embodiment of the invention as seen diagonally from the left rear of the vehicle;

FIG. 3 is an exploded perspective view showing a lock mechanism of the shift lever device pertaining to the embodiment of the invention as seen diagonally from the right front of the vehicle;

DETAILED DESCRIPTION OF THE INVENTION

Figure 1:
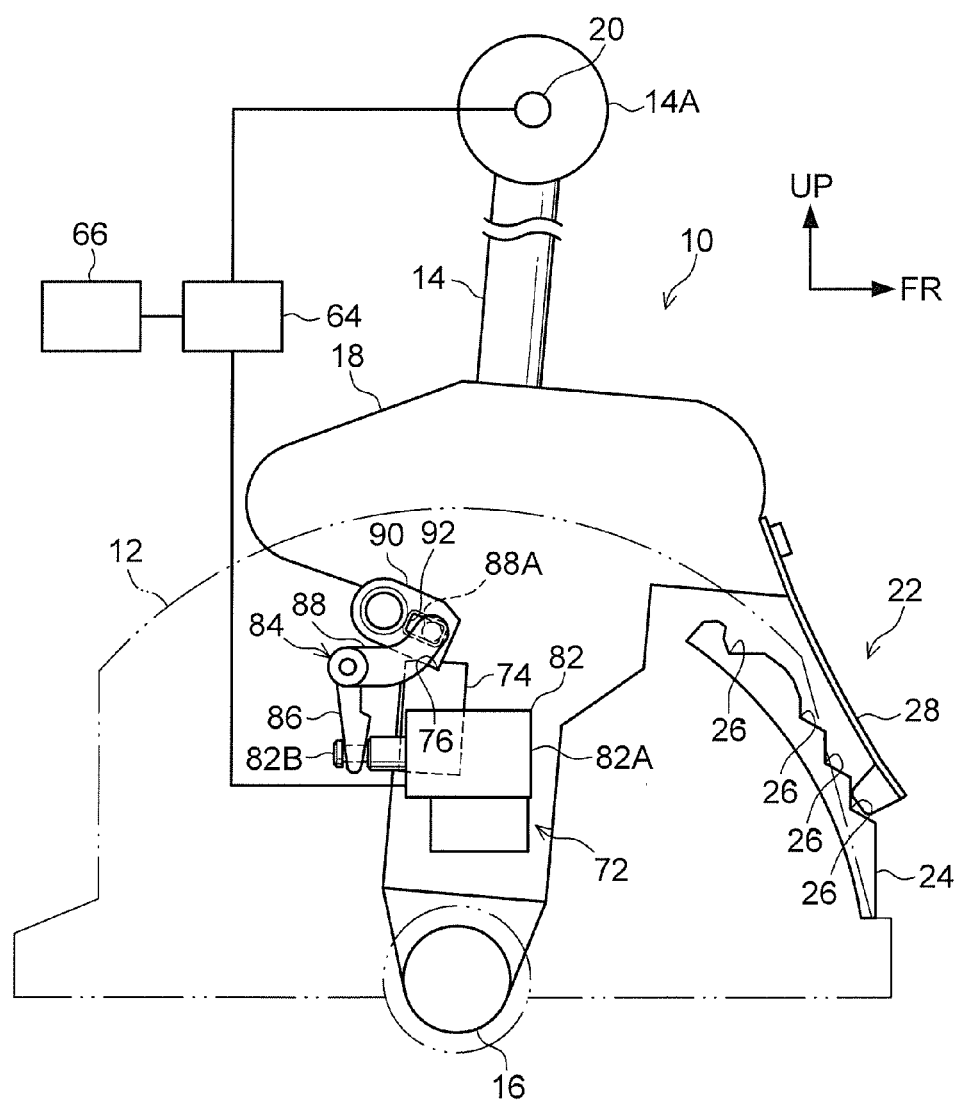
FIG. 1 is a side view showing a shift lever device pertaining to the embodiment of the invention as seen from the right of a vehicle.

In FIG. 1, a shift lever device 10 that serves as a shift device pertaining to an embodiment of the invention is shown in a side view as seen from the right of a vehicle. In the drawings, arrow FR indicates the front of the vehicle, arrow RH indicates the right of the vehicle, and arrow UP indicates up.

The shift lever device 10 pertaining to the present embodiment is a so-called floor-mounted and straight or gate type shift lever device.

As shown in FIG. 1, a body 12 that is shaped like a box and serves as an installation member is disposed in the shift lever device 10. The body 12 is installed on the vehicle body side by being fixed to the vehicle front side portion and the vehicle right-and-left direction (vehicle width direction) center portion of the floor portion in the cabin of the vehicle. The upper surface of the body 12 is open upward.

A shift lever 14 that is substantially shaped like a long and circular rod and serves as a shift member is disposed in the body 12. The lower end of the shift lever 14 is supported on a rotating shaft 16. The rotating shaft 16 is rotatably supported on the lower end of the body 12. Due to this, the shift lever 14 can be operated (rotated) in the vehicle front-and-rear direction about the rotating shaft 16.

The shift lever 14 is coupled to a lever sub-assembly 18 that is substantially shaped like a plate. The lower end of the lever sub-assembly 18 is supported on the rotating shaft 16. Due to this, the lever sub-assembly 18 can be rotated in the vehicle front-and-rear direction about the rotating shaft 16 integrally with the shift lever 14.

The shift lever 14 extends upward from the body 12. A knob 14A that serves as a grip portion is integrally disposed on the upper end portion of the shift lever 14. By the shift lever 14 being operated in the vehicle front-and-rear direction in a state where the knob 14A is gripped by an occupant (driver) of the vehicle, the shift position of the shift lever 14 is changed from the vehicle front side toward the vehicle rear side in the order of a "P" shift position (Park position), which serves as a first shift position (a predetermined shift position), and an "R" shift position (Reverse position), an "N" shift position (Neutral position), and a "D" shift position (Drive position), which each serve as a second shift position. Further, a button 20 that serves as an operation portion is disposed on the knob 14A. The button 20 can be operated (pressed).

A detent mechanism 22 is disposed between the body 12 and the shift lever 14.

A detent plate 24 that is shaped like a plate and serves as a detent member is disposed in the detent mechanism 22. The detent plate 24 is fixed to the vehicle front side end of the body 12. Plural (four in the present embodiment) detent grooves 26 that are cross-sectionally triangular (or cross-sectionally trapezoidal) are formed in, so as to penetrate, the detent plate 24. The detent grooves 26 are open from the end surface of the detent plate 24.

A detent spring 28 that is shaped like a long plate and serves as a detent urging (energizing) member is disposed in the detent mechanism 22. The proximal end of the detent spring 28 is fixed to the lever sub-assembly 18 (or the shift lever 14). The distal end of the detent spring 28 projects toward the detent plate 24 side.

When the shift lever 14 is placed in the "P" shift position, the "R" shift position, the "N" shift position, the "D" shift position, the distal end of the detent spring 28 is engaged with (inserted into) the detent groove 26 in the detent plate 24 due to the urging force of the detent spring 28, whereby the rotation (movement) of the shift lever 14 in the vehicle front-and-rear direction is restricted and the shift position of the shift lever 14 is maintained.

When the shift position of the shift lever 14 is changed, the distal end of the detent spring 28 is separated from the detent groove 26 counter to the urging force of the detent spring 28 so the urging force of the detent spring 28 is increased, thereafter the distal end of the detent spring 28 is inserted into another one of the detent grooves 26 due to the urging force of the detent spring 28 so the urging force of the detent spring 28 is decreased. For this reason, the operating force of the shift lever 14 is increased by the urging force of the detent spring 28 and is thereafter decreased, and a feeling of detent is given to the operation of the shift lever 14.

As shown in FIG. 2, an engagement mechanism 30 that configures a regulation mechanism is disposed between the body 12 and the shift lever 14.

A detent plate 32 that is substantially shaped like a plate, is made of metal, and serves as a second engagement portion is disposed in the engagement mechanism 30. The detent plate 32 is fixed to the vehicle left side of the lever sub-assembly 18 (or the shift lever 14) and can rotate in the vehicle front-and-rear direction integrally with the shift lever 14 and the lever sub-assembly 18.

Figure 4A:
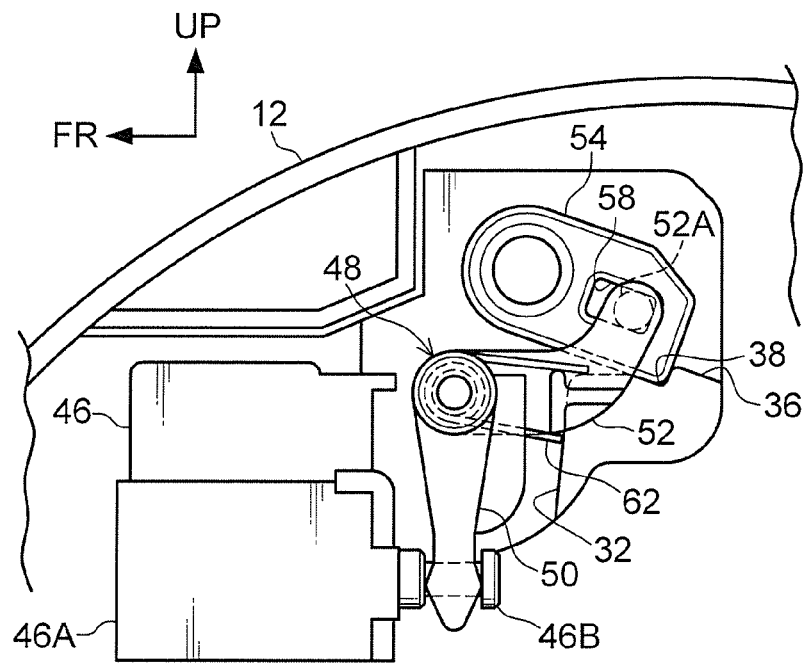
FIGS. 4A and 4B are views showing when a shift lever has been operated to a "D" shift position in the shift lever device pertaining to the embodiment of the invention, with FIG. 4A being a side view as seen from the left of the vehicle and FIG. 4B being a perspective view as seen diagonally from the left rear of the vehicle.
Figure 4B:
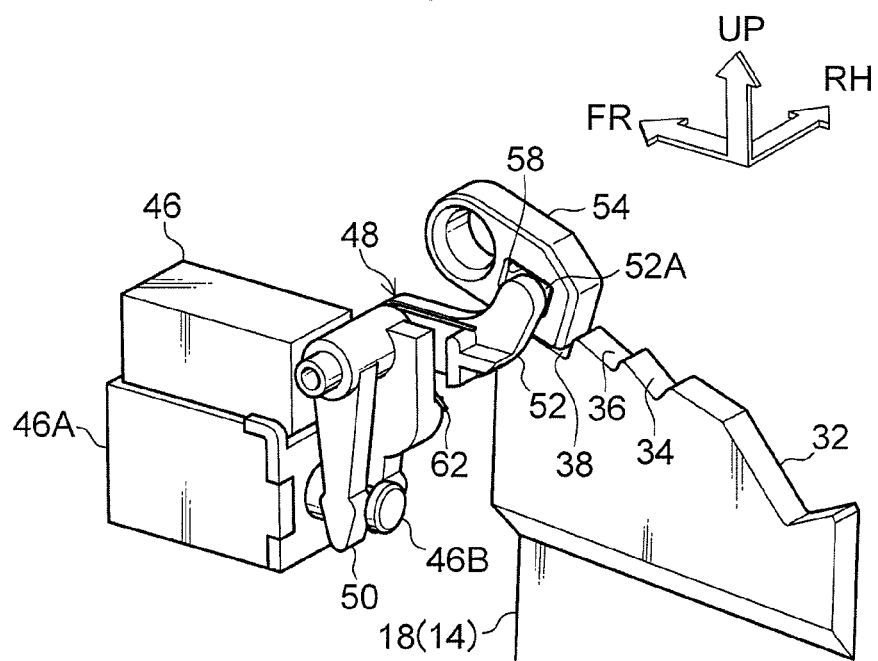
Figure 5A:
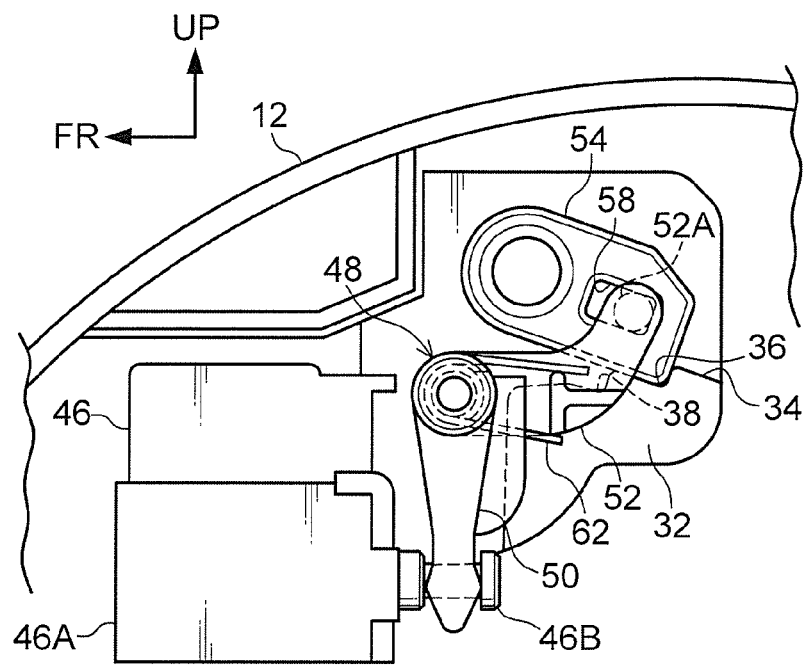
FIGS. 5A and 5B are views showing when the shift lever has been operated to an "N" shift position in the shift lever device pertaining to the embodiment of the invention, with FIG. 5A being a side view as seen from the left of the vehicle and FIG. 5B being a perspective view as seen diagonally from the left rear of the vehicle.
Figure 5B:
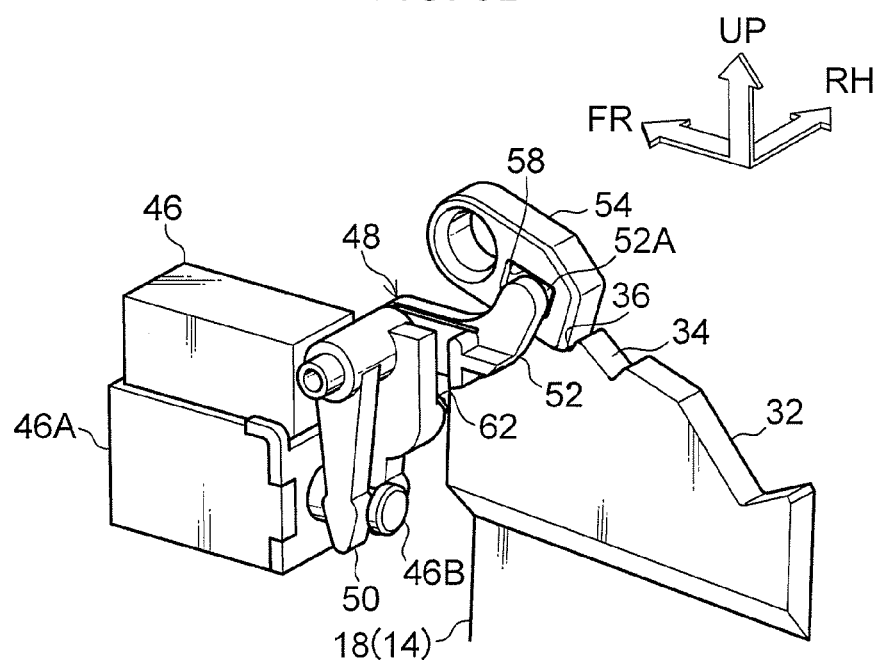

As shown in detail in FIG. 4B, an "R" groove 34, an "N" groove 36, and a "D" groove 38 that serve as engagement positions (engagement sites) are formed in, so as to penetrate, the detent plate 32. The "R" groove 34, the "N" groove 36, and the "D" groove 38 are open upward from the end surface of the detent plate 32. The "R" groove 34, the "N" groove 36, and the "D" groove 38 are placed in this order from the vehicle rear side toward the vehicle front side. The "R" groove 34, the "N" groove 36, and the "D" groove 38 are cross-sectionally triangular, and angles of inclination of the vehicle rear side surfaces (regulation surfaces) of the "R" groove 34, the "N" groove 36, and the "D" groove 38 with respect to a direction tangential to the rotation of the shift lever 14 at the bottom portion are greater compared to angles of inclination of the vehicle front side surfaces (allowance surfaces) of the "R" groove 34, the "N" groove 36, and the "D" groove 38 with respect to the direction.

As shown in FIG. 2, an engagement unit 42 is disposed in the engagement mechanism 30. The engagement unit 42 is attached to the vehicle left side of the body 12. A case 44 that is shaped like a box and made of metal is disposed in the engagement unit 42. The case 44 is fixed to the body 12, whereby the engagement unit 42 is assembled to the body 12. Further, the vehicle right side surface of the case 44 is open.

A solenoid 46 that serves as an engagement member is fixed inside the case 44. The solenoid 46 has a body portion 46A and a plunger 46B that projects toward the vehicle rear side from the body portion 46A. The plunger 46B can move in the vehicle front-and-rear direction with respect to the body portion 46A. When the solenoid 46 is supplied with electric power and driven, the plunger 46B is sucked counter to the urging force of an urging member (not shown in the drawings) into the body portion 46A. When the supply of electric power to the solenoid 46 has been stopped and the driving of the solenoid 46 has been stopped, the plunger 46B is moved toward the vehicle rear side by the urging force of the urging member with respect to the body portion 46A.

An actuation link 48 that is substantially shaped like an "L" as seen in a side view, is made of resin, and serves as an actuation member is rotatably supported inside the case 44. A drive portion 50 and an actuation portion 52 are disposed as separate bodies in the actuation link 48. The upper end of the drive portion 50 and the vehicle front side end (proximal end) of the actuation portion 52 are rotatably attached to each other. The drive portion 50 extends downward from the vehicle front side end of the actuation portion 52. The actuation portion 52 extends toward the vehicle rear side from the upper end of the drive portion 50. A torsion coil spring 62 that serves as an engagement urging member is disposed between, so as to bridge, the drive portion 50 and the actuation portion 52. The torsion coil spring 62 urges the actuation portion 52 downward with respect to the drive portion 50, whereby the drive unit 50 stops the rotation of the actuation portion 52 downward.

The drive portion 50 is engaged with the plunger 46B of the solenoid 46. The drive portion 50 is moved integrally with the plunger 46B, whereby the actuation link 48 can rotate. The actuation portion 52 is shaped like an "L" as seen in a plan view. A distal (tip) end portion 52A of the actuation portion 52 extends in the vehicle right direction and is shaped like a cylinder.

A regulation link 54 that is substantially shaped like a rectangular plate, is made of metal, and serves as a first engagement portion (regulation member) is disposed inside the case 44. The regulation link 54 is rotatably supported at its vehicle front side portion on the vehicle left side of the body 12 (or inside the case 44). A long hole 58 is formed in, so as to penetrate, the vehicle rear side portion of the regulation link 54. The distal end portion 52A of the actuation portion 52 in the actuation link 48 is inserted into the long hole 58, whereby the regulation link 54 is engaged with the detent plate 32. The distal end portion 52A of the actuation portion 52 can move along the lengthwise direction of the long hole 58. By the actuation link 48 being rotated, the distal end portion 52A of the actuation portion 52 is moved along the lengthwise direction of the long hole 58 so the regulation link 54 is rotated.

As shown in FIG. 1 and FIG. 3, a lock mechanism 72 (shift lock mechanism) that configures a regulation mechanism is disposed between the body 12 and the shift lever 14.

A lock plate 74 that is substantially shaped like a plate, is made of metal, and serves as a second regulation portion is disposed in the lock mechanism 72. The lock plate 74 is fixed to the vehicle right side of the lever sub-assembly 18 (or the shift lever 14) and can rotate in the vehicle front-and-rear direction integrally with the shift lever 14 and the lever sub-assembly 18.

A "P" groove 76 that serves as a regulation position (regulation site) is formed in, so as to penetrate, the lock plate 74. The "P" groove 76 is open upward from the end surface of the lock plate 74. The "P" groove 76 is cross-sectionally triangular. The angle of inclination of the vehicle front side surface (regulation surface) of the "P" groove 76 with respect to a direction tangential to the rotation of the shift lever 14 at the bottom portion is greater than that of the vehicle rear side surface of the "P" groove 76 with respect to the direction.

A lock unit 78 is disposed in the lock mechanism 72. The lock unit 78 is attached to the vehicle right side of the body 12. A lock case 80 that is shaped like a box and made of metal is disposed in the lock unit 78. The lock case 80 is fixed to the body 12, whereby the lock unit 78 is attached to the body 12. Further, the vehicle left side surface of the lock case 80 is open.

A lock solenoid 82 that serves as a regulation member is fixed inside the lock case 80. The lock solenoid 82 has a body portion 82A and a plunger 82B that projects toward the vehicle rear side from the body portion 82A. The plunger 82B can move freely in the vehicle front-and-rear direction with respect to the body portion 82A. When the lock solenoid 82 has been supplied with electric power and driven, the plunger 82B is sucked into the body portion 82A and is moved toward the vehicle front side.

A drive link 84 that is substantially shaped like an "L" as seen in a side view, is made of resin, and serves as a drive member is rotatably supported inside the lock case 80. A drive portion 86 is disposed on the drive link 84. The drive portion 86 extends downward. The drive portion 86 is engaged with the plunger 82B of the lock solenoid 82. By the drive portion 86 being moved integrally with the plunger 82B, the drive link 84 can rotate. An actuation portion 88 is disposed on the drive link 84. The actuation portion 88 extends toward the vehicle front side from the upper end of the drive portion 86 and is integrated with the drive portion 86. The actuation portion 88 is shaped like an "L" as seen in a plan view. A distal end portion 88A of the actuation portion 88 extends to the vehicle left and is shaped like a cylinder.

A lock link 90 that is substantially shaped like a rectangular plate, is made of metal, and serves as a first regulation portion is disposed on the vehicle left side of the actuation portion 88 of the drive link 84. The lock link 90 is rotatably supported at its vehicle rear side portion on the vehicle right side of the body 12 (or inside the lock case 80). A long hole 92 is formed in, so as to penetrate, the vehicle front side portion of the lock link 90. The distal end portion 88A of the actuation portion 88 in the drive link 84 is inserted into the long hole 92. The distal end portion 88A of the actuation portion 88 can move along the lengthwise direction of the long hole 92. By the drive link 84 being rotated, the distal end portion 88A of the actuation portion 88 is moved along the lengthwise direction of the long hole 92 and the lock link 90 is rotated.

A torsion spring 94 (torsion coil spring) that serves as a regulation urging member is disposed between, so as to bridge, the lock case 80 and the drive link 84. The torsion spring 94 urges the drive link 84 in a direction in which the drive portion 86 heads toward the vehicle rear side and a direction in which the actuation portion 88 heads downward, and the torsion spring 94 urges the lock link 90 downward. For this reason, the lock link 90 is engaged with the lock plate 74 due to the urging force of the torsion spring 94.

The button 20 on the knob 14A, the solenoid 46, and the lock solenoid 82 are electrically connected to a control device 64. A brake (pedal) 66 that serves as a brake portion of the vehicle and an operation portion of the vehicle is electrically connected to the control device 64. By the brakes 66 being operated (pressed), the vehicle is braked. The control device 64 can control the solenoid 46 and the lock solenoid 82. The control device 64 can stop the supply of electric power to the solenoid 46 to thereby stop the driving of the solenoid 46 by the button 20 being operated, and the control device 64 can also supply electric power to the lock solenoid 82 to thereby drive the lock solenoid 82 by the button 20 being operated and the brake 66 being operated.

Next, the operation of the present embodiment will be described.

In the shift lever device 10 of the above configuration, by that the shift lever 14 is operated in the vehicle front-and-rear direction in a state where the knob 14A is gripped by the occupant, the shift position is changed to the "P" shift position, the "R" shift position, the "N" shift position, the "D" shift position.

In the detent mechanism 22, when the shift lever 14 is placed in the "P" shift position, the "R" shift position, the "N" shift position, the "D" shift position, the distal end of the detent spring 28 is engaged with the corresponding detent groove 26 in the detent plate 24 due to the urging force of the detent spring 28, whereby the shift position of the shift lever 14 is maintained. When the shift position of the shift lever 14 is changed, the distal end of the detent spring 28 is separated from the detent groove 24 and is thereafter inserted into another of the detent grooves 26, whereby the operating force of the shift lever 14 is increased and is thereafter decreased, and a feeling of detent is given to the operation of the shift lever 14.

Figure 8:
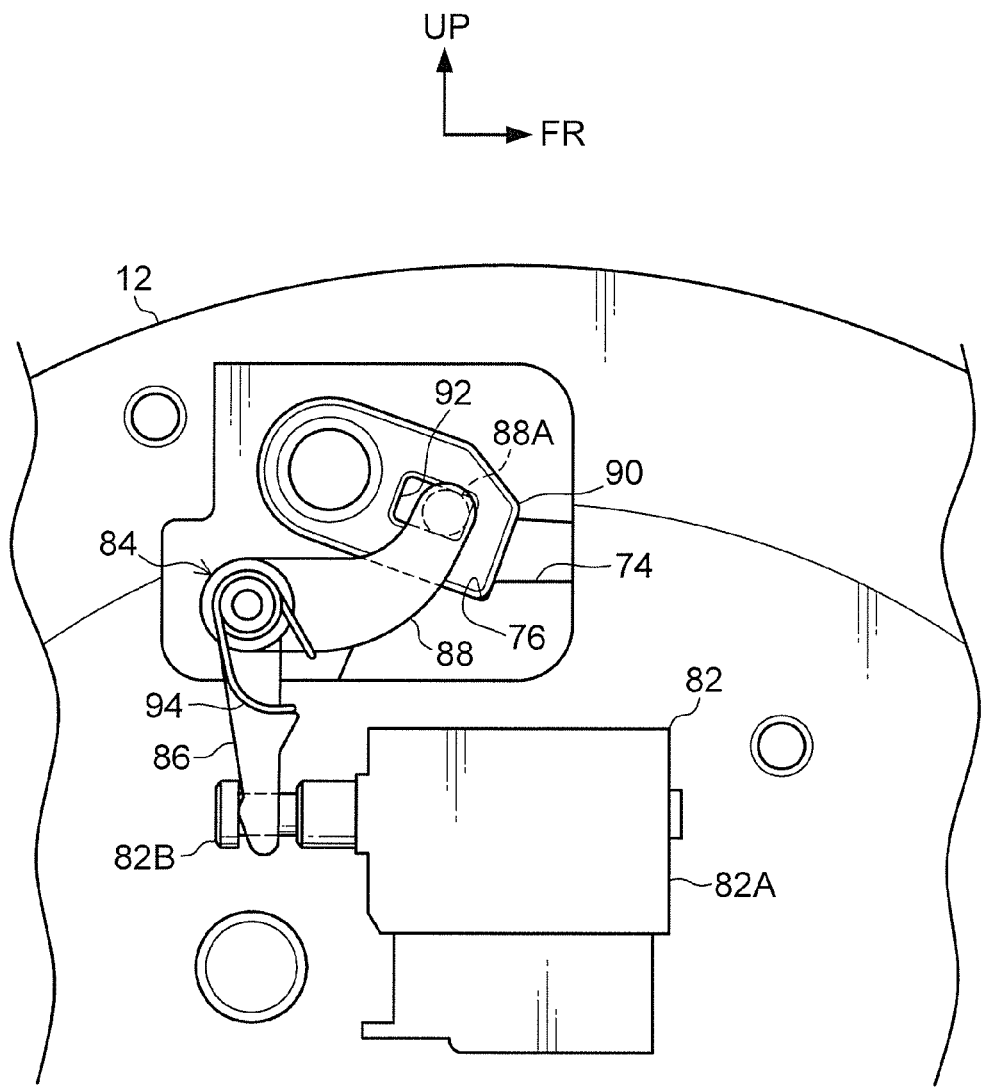
FIG. 8 is a side view showing when the shift lever has been operated to a "P" shift position in the shift lever device pertaining to the embodiment of the invention as seen from the right of the vehicle.

As shown in FIG. 8, in the lock mechanism 72, when the shift lever 14 is operated to the "P" shift position, the lock link 90 is engaged with (inserted into) the "P" groove 76 in the lock plate 74 due to the urging force of the torsion spring 94. For this reason, the vehicle front side surface of the lock link 90 is caught on the vehicle front side surface of the "P" groove 76 and operation of the shift lever 14 toward the vehicle rear side is regulated (locked), whereby operation of the shift lever 14 from the "P" shift position to the "R" shift position is regulated.

Figure 9:
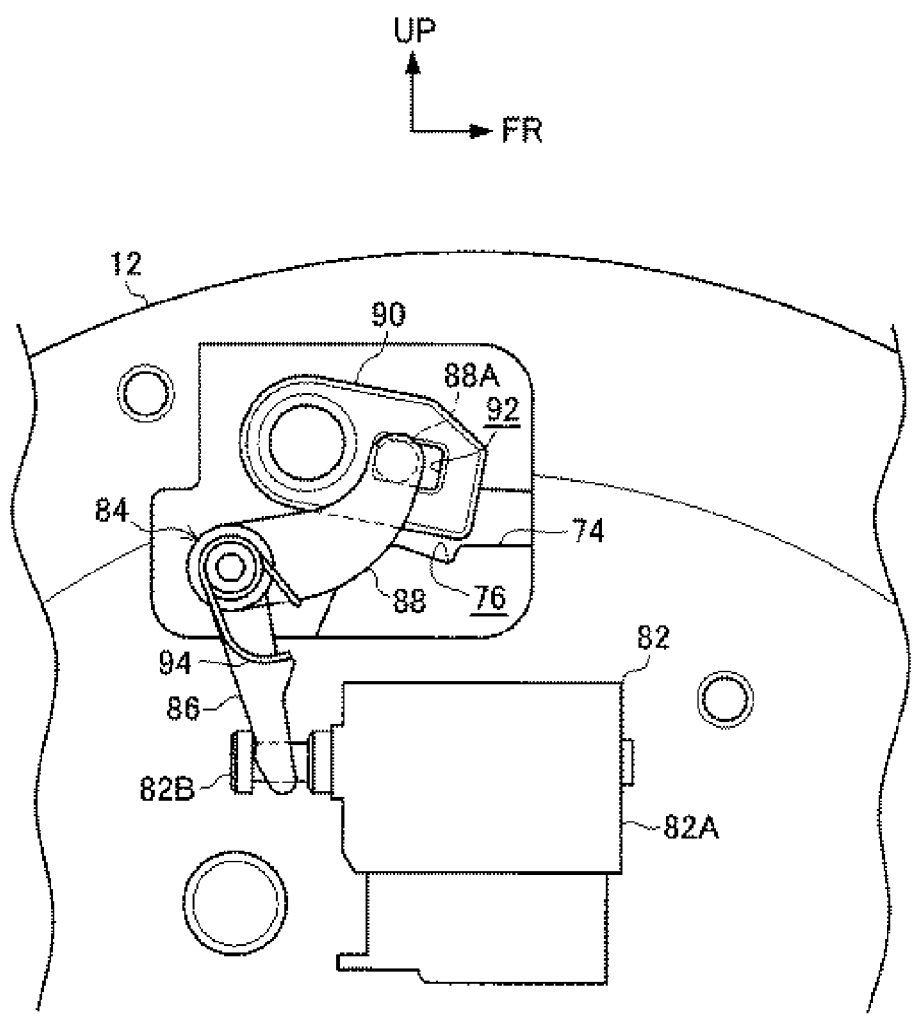
FIG. 9 is a side view showing when the shift lever is operated from the "P" shift position to the "R" shift position side in the shift lever device pertaining to the embodiment of the invention as seen from the right of the vehicle.

As shown in FIG. 9, when the button 20 on the knob 14A and the brake 66 are operated in a state where the shift lever 14 has been operated to the "P" shift position (in a state where the shift lever 14 is at the "P" shift position), electric power is supplied to the lock solenoid 82 by the control of the control device 64 and the lock solenoid 82 is driven. For this reason, the plunger 82B is moved toward the vehicle front side as a result of being sucked into the body portion 82B, whereby the drive link 84 is rotated counter to the urging force of the torsion spring 94 and the lock link 90 is rotated upward. Due to this, the lock link 90 becomes disengaged from the "P" groove 76, whereby operation of the shift lever 14 toward the vehicle rear side is allowed and operation of the shift lever 14 from the "P" shift position to the "R" shift position is allowed.

Consequently, operation of the shift lever 14 from the "P" shift position to the "R" shift position can be switched from regulated to allowed by operating the button 20 and the brake 66.

For example, as shown in FIGS. 4A and 4B and FIGS. 5A and 5B, in the engagement mechanism 30, by that electric power is supplied to the solenoid 46 by the control of the control device 64 and the solenoid 46 is driven, the plunger 46B is sucked counter to the urging force of the urging member into the body portion 46A. For this reason, when the shift lever 14 is operated to the "R" shift position, the "N" shift position, the "D" shift position, the regulation link 54 is engaged with (inserted into) the "R" groove 34, the "N" groove 36, the "D" groove 38, respectively, due to the urging force of the torsion coil spring 62.

Figure 6A:
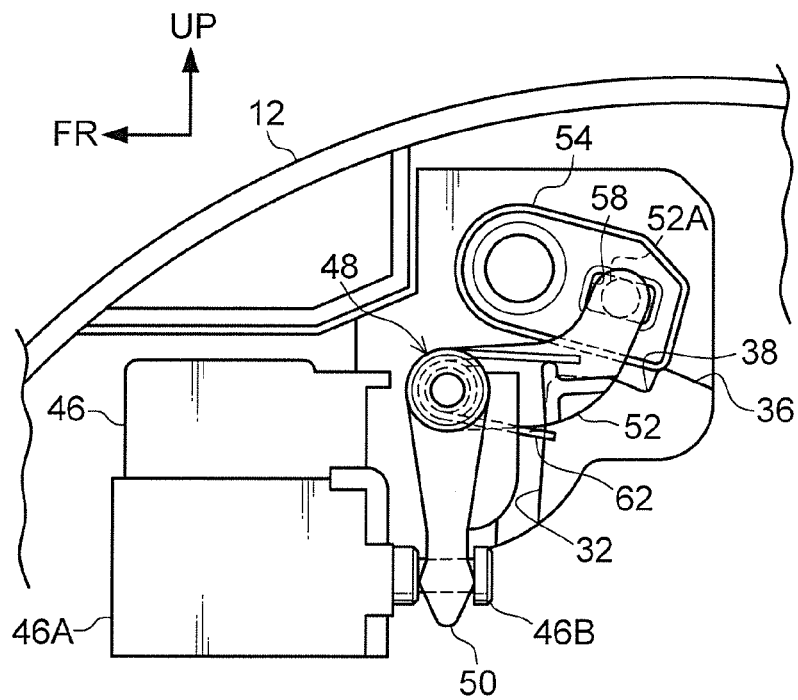
FIGS. 6A and 6B are views showing when the shift lever is operated from the "N" shift position to the "D" shift position in the shift lever device pertaining to the embodiment of the invention, with FIG. 6A being a side view as seen from the left of the vehicle and FIG. 6B being a perspective view as seen diagonally from the left rear of the vehicle.
Figure 6B:
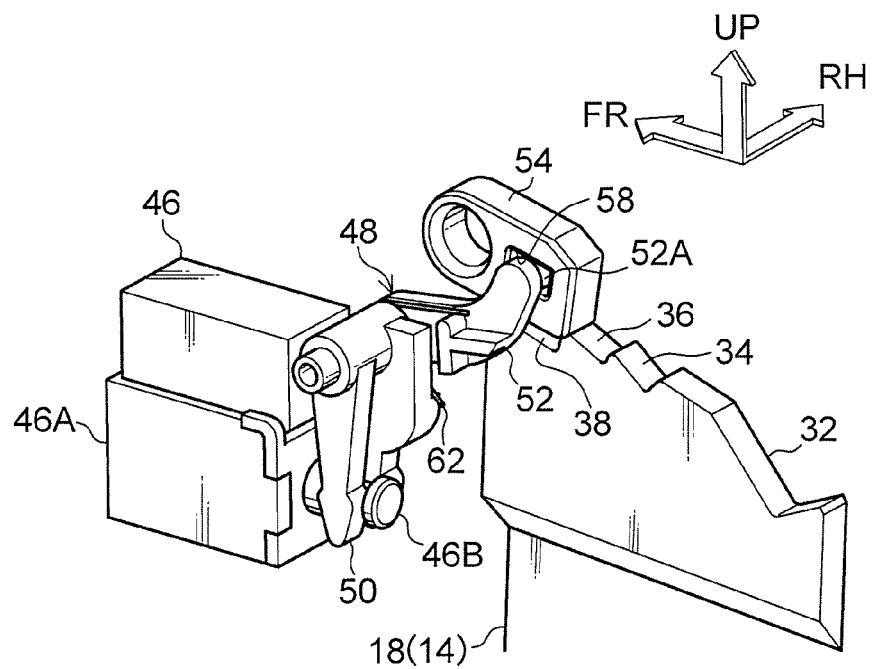

At this time, the undersurface of the regulation link 54 is not caught on the vehicle front side surface of the "R" groove 34, the vehicle front side surface of the "N" groove 36, the vehicle front side surface of the "D" groove 38. For this reason, as shown in FIGS. 6A and 6B, the regulation link 54 is rotated upward by the vehicle front side surface of the "R" groove 34, the vehicle front side surface of the "N" groove 36, the vehicle front side surface of the "D" groove 38 counter to the urging force of the torsion coil spring 62, and in the actuation link 48 the actuation portion 52 is rotated upward with respect to the drive portion 50, whereby the regulation link 54 becomes disengaged from the "R" groove 34, the "N" groove 36, the "D" groove 38 and operation of the shift lever 14 toward the vehicle rear side is allowed. Due to this, operation of the shift lever 14 from the "R" shift position to the "N" shift position, operation of the shift lever 14 from the "N" shift position to the "D" shift position, and operation of the shift lever 14 from the "D" shift position toward the vehicle rear side are allowed.

Consequently, even without the button 20 on the knob 14A being operated, operation of the shift lever 14 from the "R"

shift position to the "N" shift position, operation of the shift lever 14 from the "N" shift position to the "D" shift position, and operation of the shift lever 14 from the "D" shift position toward the vehicle rear side can be smoothly performed.

On the other hand, the vehicle rear side surface of the regulation link 54 is caught on the vehicle rear side surface of the "R" groove 34, the vehicle rear side surface of the "N" groove 36, the vehicle rear side surface of the "D" groove 38. For this reason, operation of the shift lever 14 toward the vehicle front side is regulated (locked), and operation of the shift lever 14 from the "R" shift position to the "P" shift position, operation of the shift lever 14 from the "N" shift position to the "R" shift position, and operation of the shift lever 14 from the "D" shift position to the "N" shift position are regulated.

Figure 7A:
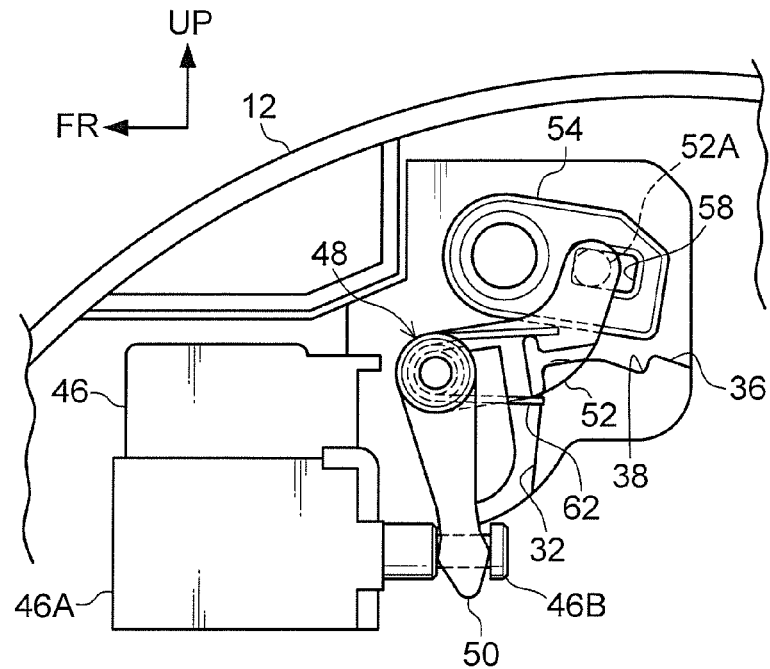
FIGS. 7A and 7B are views showing when the shift lever is operated from the "D" shift position to the "N" shift position side in the shift lever device pertaining to the embodiment of the invention, with FIG. 7A being a side view as seen from the left of the vehicle and FIG. 7B being a perspective view as seen diagonally from the left rear of the vehicle.
Figure 7B:
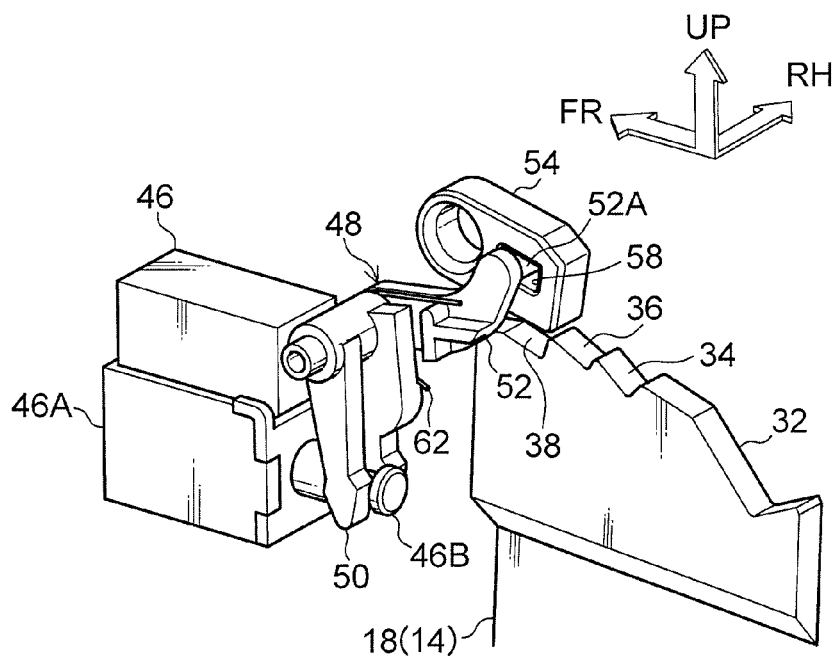

For example, as shown in FIGS. 7A and 7B, when the button 20 on the knob 14A is operated in a state where the shift lever 14 has been operated to the "R" shift position, the "N" shift position, the "D" shift position (in a state where the shift lever 14 is at the "R" shift position, the "N" shift position, the "D" shift position), the supply of electric power to the solenoid 46 is stopped by the control of the control device 64 and the driving of the solenoid 46 is stopped. For this reason, the plunger 46B is moved toward the vehicle rear side by the urging force of the urging member with respect to the body portion 46A, whereby the actuation link 48 is rotated and the regulation link 54 is rotated upward. Due to this, the regulation link 54 becomes disengaged from the "R" groove 34, the "N" groove 36, the "D" groove "38", whereby operation of the shift lever 14 toward the vehicle front side is allowed, and operation of the shift lever 14 from the "R" shift position to the "P" shift position, operation of the shift lever 14 from the "N" shift position to the "R" shift position, and operation of the shift lever 14 from the "D" shift position to the "N" shift position are allowed.

Consequently, operation of the shift lever 14 from the "R" shift position to the "P" shift position, operation of the shift lever 14 from the "N" shift position to the "R" shift position, and operation of the shift lever 14 from the "D" shift position to the "N" shift position can be switched from regulated to allowed by operating the button 20.

Here, when electric power is not supplied to the solenoid 46 in a state where the shift lever 14 has been operated to the "R" shift position, the "N" shift position, the "D" shift position, operation of the shift lever 14 toward the vehicle front side is allowed by the engagement mechanism 30, and operation of the shift lever 14 from the "R" shift position to the "P" shift position, operation of the shift lever 14 from the "N" shift position to the "R" shift position, and operation of the shift lever 14 from the "D" shift position to the "N" shift position are allowed.

Moreover, when electric power is not supplied to the lock solenoid 82 in a state where the shift lever 14 has been operated to the "P" shift position, operation of the shift lever 14 toward the vehicle rear side is regulated by the lock mechanism 72, and operation of the shift lever 14 from the "P" shift position to the "R" shift position is regulated.

For this reason, in a case where the shift position of the shift lever 14 is the "R" shift position, the "N" shift position, and the "D" shift position, other than the "P" shift position, when electric power is not supplied to the solenoid 46 and the lock solenoid 82, by operating the shift lever 14 to the "P" shift position, then operation of the shift lever 14 from the "P" shift position is regulated. Moreover, in a case where the shift position of the shift lever 14 is the "P" shift position when electric power is not supplied to the solenoid 46 and the lock solenoid 82, operation of the shift lever 14 from the "P" shift position is regulated.

Due to this, even when electric power is not supplied to the solenoid 46 and the lock solenoid 82 due to a system error of the vehicle for example (at the time of a vehicle emergency), particularly while the vehicle is traveling, the shift lever 14 can be operated to the "P" shift position and operation of the shift lever 14 from the "P" shift position can be regulated, so the shift lever 14 can be easily placed in the "P" shift position.

Consequently, after electric power is not supplied to the solenoid 46 and the lock solenoid 82, even when the occupant moves away from the vehicle and leaves the vehicle unattended, the shift lever 14 can be placed in the "P" shift position, placing the shift position of the shift lever 14 to shift position other than the "P" shift position" can be avoided, so the occupant can be suppressed from feeling a sense of anxiety in leaving the vehicle unattended. Moreover, when the occupant restarts the engine of the vehicle, the occupant can be suppressed from misunderstanding the shift position of the shift lever 14 because the shift position of the shift lever 14 is the "P" shift position.

Further, when the shift lever 14 is operated from the "R" shift position to the "N" shift position, when the shift lever 14 is operated from the "N" shift position to the "D" shift position, and when the shift lever 14 is operated from the "D" shift position toward the vehicle rear side, the regulation link 54 is rotated upward by the vehicle front side surface of the "R" groove 34, the vehicle front side surface of the "N" groove 36, and the vehicle front side surface of the "D" groove 38, counter to the urging force of the torsion coil spring 62, and the actuation link 48 is rotated, whereby the urging force of the torsion coil spring 62 is increased, so the force of engagement of the regulation link 54 with the "R" groove 34, the "N" groove 36, and the "D" groove 38 is increased.

For this reason, not only can a feeling of operation be given to the operation of the shift lever 14 due to the urging force of the detent spring 28 as described above, but also a feel of operation can be given to the operation of the shift lever 14 due to the urging force of the torsion coil spring 62. Due to this, a feeling of detent can be effectively given to the operation of the shift lever 14.

Moreover, the button 20 is disposed on the knob 14A. For this reason, the button 20 can be easily operated, and in a state where the shift lever 14 has been operated to the "R" shift position, the "N" shift position, and the "D" shift position, the regulation of the operation of the shift lever 14 can be easily released.

Further, the button 20 on the knob 14A is electrically connected to the engagement mechanism 30, so a mechanical connection mechanism that connects the button 20 on the knob 14A to the engagement mechanism 30 is unnecessary. For this reason, the number of parts can be reduced, the configuration of the shift lever 14 (including the knob 14A) can be made simple, costs can be reduced, the shift lever 14 can be electrified, and the design of the knob 14A can be enhanced (e.g., illumination can be disposed in the knob 14A). Moreover, the occurrence of operation sounds when the button 20 has been operated can be suppressed, and the operational feel of the button 20 can be improved.

In the present embodiment, the regulation of the operation of the shift lever 14 is released when both the button 20 on the knob 14A and the brake 66 are operated in a state where the shift lever 14 has been operated to the "P" shift position. However, the regulation of the operation of the shift lever 14 may also be released when one of the button 20 on the knob 14A or the brake 66 is operated in a state where the shift lever 14 has been operated to the "P" shift position.

Further, in the present embodiment, in the engagement mechanism 30, the detent plate 32 is disposed on the shift lever 14 side and the engagement unit 42 is disposed on the vehicle body side. However, in the engagement mechanism 30, the detent plate 32 may also be disposed on the vehicle body side and the engagement unit 42 may also be disposed on the shift lever 14 side.

Moreover, in the present embodiment, in the lock mechanism 72, the lock plate 74 is disposed on the shift lever 14 side and the lock unit 78 is disposed on the vehicle body side. However, in the lock mechanism 72, the lock plate 74 may also be disposed on the vehicle body side and the lock unit 78 may also be disposed on the shift lever 14 side.

Moreover, in the present embodiment, in the detent mechanism 22, the detent plate 24 is disposed on the vehicle body side and the detent spring 28 is disposed on the shift lever 14 side. However, in the detent mechanism 22, the detent plate 24 may also be disposed on the shift lever 14 side and the detent spring 28 may also be disposed on the vehicle body side.

Further, in the present embodiment, the shift lever device 10 has a configuration where it is floor-mounted shift lever device and installed on the floor of the cabin, but the shift lever device 10 may also have a configuration where it is installed in the steering column of the vehicle or a configuration where it is installed in the instrument panel of the vehicle.

What is claimed is:

1. A shift device comprising:
   a shift member whose shift position is configured to be changed by the shift member being operated; and
   a regulation mechanism, by which operation of the shift member toward a predetermined shift position is regulated and operation of the shift member from the predetermined shift position is allowed by electric power being supplied to the regulation mechanism, and by which operation of the shift member toward the predetermined shift position is allowed and operation of the shift member from the predetermined shift position is regulated by electric power not being supplied to the regulation mechanism; and
   an operation portion that can be operated;
   wherein the regulation mechanism includes an engagement mechanism and a lock mechanism, and electric power is supplied to the engagement mechanism and operation of the shift member toward the predetermined shift position is regulated by the operation portion not being operated, and electric power is not supplied to the engagement mechanism and operation of the shift member toward the predetermined shift position is allowed by the operation portion being operated, and
   electric power is not supplied to the lock mechanism and operation of the shift member toward the predetermined shift position is regulated by the operation portion not being operated, and electric power is supplied to the lock mechanism and operation of the shift member from the predetermined shift position is allowed by the operation portion being operated.

2. The shift device of claim 1, wherein the operation portion is disposed on the shift member.

3. The shift device of claim 1, wherein
   in a state in which the shift member is at a position other than the predetermined shift position, electric power is supplied to the engagement mechanism and operation of the shift member toward the predetermined shift position is regulated by the operation portion not being operated, and
   electric power is not supplied to the engagement mechanism and operation of the shift member toward the predetermined shift position is allowed by the operation portion being operated.

4. The shift device of claim 3, wherein
   in a state in which the shift member is at the predetermined shift position, electric power is not supplied to the lock mechanism and operation of the shift member from the predetermined shift position is regulated by the operation portion not being operated, and
   electric power is supplied to the lock mechanism and operation of the shift member from the predetermined shift position is allowed by the operation portion being operated.

5. The shift device of claim 1, wherein
   by electric power not being supplied to the engagement mechanism by the operation portion being operated, engagement by the engagement mechanism between a body at which the shift member is rotatably supported and the shift member is released.

6. The shift device of claim 5, wherein
   by electric power being supplied to the lock mechanism by the operation portion being operated, engagement by the lock mechanism between a body at which the shift member is rotatably supported and the shift member is released.

* * * * *